United States Patent
Gui et al.

(10) Patent No.: US 10,713,542 B2
(45) Date of Patent: Jul. 14, 2020

(54) DETECTION OF PLANT DISEASES WITH MULTI-STAGE, MULTI-SCALE DEEP LEARNING

(71) Applicant: The Climate Corporation, San Francisco, CA (US)

(72) Inventors: Yichuan Gui, Pacifica, CA (US); Wei Guan, Pleasanton, CA (US)

(73) Assignee: THE CLIMATE CORPORATION, San Francisco, CA (US)

( * ) Notice: Subject to any disclaimer, the term of this patent is extended or adjusted under 35 U.S.C. 154(b) by 0 days.

(21) Appl. No.: 16/662,017

(22) Filed: Oct. 23, 2019

(65) Prior Publication Data

US 2020/0134392 A1    Apr. 30, 2020

Related U.S. Application Data

(60) Provisional application No. 62/750,143, filed on Oct. 24, 2018.

(51) Int. Cl.
   *G06K 9/00*    (2006.01)
   *G06K 9/62*    (2006.01)
   (Continued)

(52) U.S. Cl.
   CPC ......... *G06K 9/6281* (2013.01); *G06K 9/6256* (2013.01); *G06K 9/6292* (2013.01);
   (Continued)

(58) Field of Classification Search
   CPC .. G06K 9/6256; G06K 9/6292; G06N 3/0454; G06N 3/08; G06T 3/40;
   (Continued)

(56) References Cited

U.S. PATENT DOCUMENTS 10,255,670 B1 * 4/2019 Wu ..................... H04N 5/2252
10,423,850 B2 * 9/2019 Chen ....................... A01H 1/04
(Continued)

OTHER PUBLICATIONS

Yao et al., "Learning to Diagnose from Scratch by Exploiting Dependencies Among Labels", CoRR, https://arxiv.org/abs/1710.10501, dated Feb. 1, 2018, 12 pages.
(Continued)

*Primary Examiner* — Sean T Motsinger
(74) *Attorney, Agent, or Firm* — Hickman Palermo Becker Bingham LLP

(57) ABSTRACT

In some embodiments, the system is programmed to build from multiple training sets multiple digital models, each for recognizing plant diseases having symptoms of similar sizes. Each digital model can be implemented with a deep learning architecture that classifies an image into one of several classes. For each training set, the system is thus programmed to collect images showing symptoms of one or more plant diseases having similar sizes. These images are then assigned to multiple disease classes. For a first one of the training sets used to build the first digital model, the system is programmed to also include images that correspond to a healthy condition and images of symptoms having other sizes. These images are then assigned to a no-disease class and a catch-all class. Given a new image from a user device, the system is programmed to then first apply the first digital model. For the portions of the new image that are classified into the catch-all class, the system is programmed to then apply another one of the digital models. The system is programmed to finally transmit classification data to the user device indicating how each portion of the new image is classified into a class corresponding to a plant disease or no plant disease.

20 Claims, 12 Drawing Sheets

(51) Int. Cl.
*G06N 3/08* (2006.01)
*G06N 3/04* (2006.01)
*G06T 7/00* (2017.01)
*G06T 3/40* (2006.01)
*A01G 7/00* (2006.01)

(52) U.S. Cl.
CPC .............. *G06N 3/0454* (2013.01); *G06N 3/08* (2013.01); *G06T 3/40* (2013.01); *G06T 7/0012* (2013.01); *A01G 7/00* (2013.01); *G06T 2207/20016* (2013.01); *G06T 2207/20081* (2013.01); *G06T 2207/20084* (2013.01)

(58) Field of Classification Search
CPC ......... G06T 7/0012; G06T 2207/20016; G06T 2207/20081; G06T 2207/20084; A01G 7/00
See application file for complete search history.

(56) References Cited

U.S. PATENT DOCUMENTS

| | | | | |
|---|---|---|---|---|
| 10,438,302 | B2* | 10/2019 | Bedoya | G06K 9/46 |
| 2013/0136312 | A1* | 5/2013 | Tseng | G06K 9/34 |
| | | | | 382/110 |
| 2018/0197048 | A1* | 7/2018 | Micks | G06K 9/628 |
| 2018/0330166 | A1* | 11/2018 | Redden | G06K 9/3241 |
| 2019/0108413 | A1* | 4/2019 | Chen | C12N 15/8281 |
| 2019/0114481 | A1* | 4/2019 | DeChant | G06N 3/084 |
| 2020/0120267 | A1* | 4/2020 | Stelmar Netto | H04N 5/23222 |
| 2020/0124581 | A1* | 4/2020 | Gui | G06N 3/08 |
| 2020/0134392 | A1* | 4/2020 | Gui | G06N 3/08 |

OTHER PUBLICATIONS

Wei et al., "CNN: Single-label to Multi-label", CoRR, https://arxiv.org/abs/1406.5726, dated Jul. 9, 2014, pages.
Wang et al., "CNN-RNN: A Unified Framework for Multi-label Image Classification", CoRR, https://arxiv.org/abs/1604.04573, dated 2016, 10 pages.
Szegedy et al., "Going Deeper with Convolutions", CoRR, https://arxiv.org/abs/1409.4842, dated Sep. 17, 2014, 12 pages.
Stone et al., "Teaching Compositionality to Cnns" CoRR, https://arxiv.org/abs/1706.04313, dated Jun. 14, 2017, 10 pages.
Simonyan et al., "Very Deep Convolutional Networks for Large-scale Image Recognition", https://arxiv.org/abs/1409.1556, dated Apr. 10, 2015, 14 pages.
Sermanet et al., "Overfeat: Integrated Recognition, Localization and Detection Using Convolutional Networks" CoRR, http://arxiv.org/abs/1312.6229, dated Feb. 24, 2014 pages.
Russakovsky et al., "ImageNet Large Scale Visual Recognition Challenge", International Journal of Computer Vision (IJCV), dated Jan. 30, 2015, 43 pages.
Ren et al., "Faster R-CNN: Towards Real-time Object Detection With Region Proposal Networks", CoRR, abs/1506.01497, dated Jan. 6, 2016, 14 pages.
Redmon et al., "You Only Look Once: Unified, Real-time Object Detection". CoRR, http://arxiv.org/abs/1506.02640, dated Jun. 8, 2015, 10 pages.
Liu et al., "SSD: Single Shot Multibox Detector" CoRR, https://arxiv.org/abs/1512.02325v1 for v1, dated Dec. 8, 2015, 17 pages.
Krizhevsky et al., "ImageNet Classification with Deep Convolutional Neural Networks", Cited in Advances in Neural Information Processing Systems 25 (NIPS 2012), Curran Associates, dated 2012, 9 pages.
He et al., "Deep Residual Learning for Image Recognition". In 2016 IEEE Conference on Computer Vision and Pattern Recognition dated 2016, pp. 770-778.
DeChant et al., "Automated Identification of Northern Leaf Blight-infected Maize Plants From Field Imagery Using Deep Learning",Phytopathology, dated 2017, 7 pages.
Dai et al., "R-FCN: Object DetectionVia Regionbased Fully Convolutional Networks", http://arxiv.org/abs/1605.06409, CoRR, abs/1605.06409, dated Jul. 21, 2016, 11 pages.
The International Searching Authority, "Search Report" in application No. PCT/US19/57819, dated Jan. 17, 2020, 16 pages.
Konstantinos, F., "Deep Learning Lodels for Plant Disease Detection and Dignosis" dated Feb. 7, 2018, 9 pages.
Garcia et al., "Digital Image Processing Techniques for Detecting, Quantifying and Classifying Plant Diseases", dated Dec. 7, 2013, 12 pages.
Current Claims in application No. PCT/US19/57819, dated Jan. 2020, 6 pages.

\* cited by examiner

Fig. 2
(a)
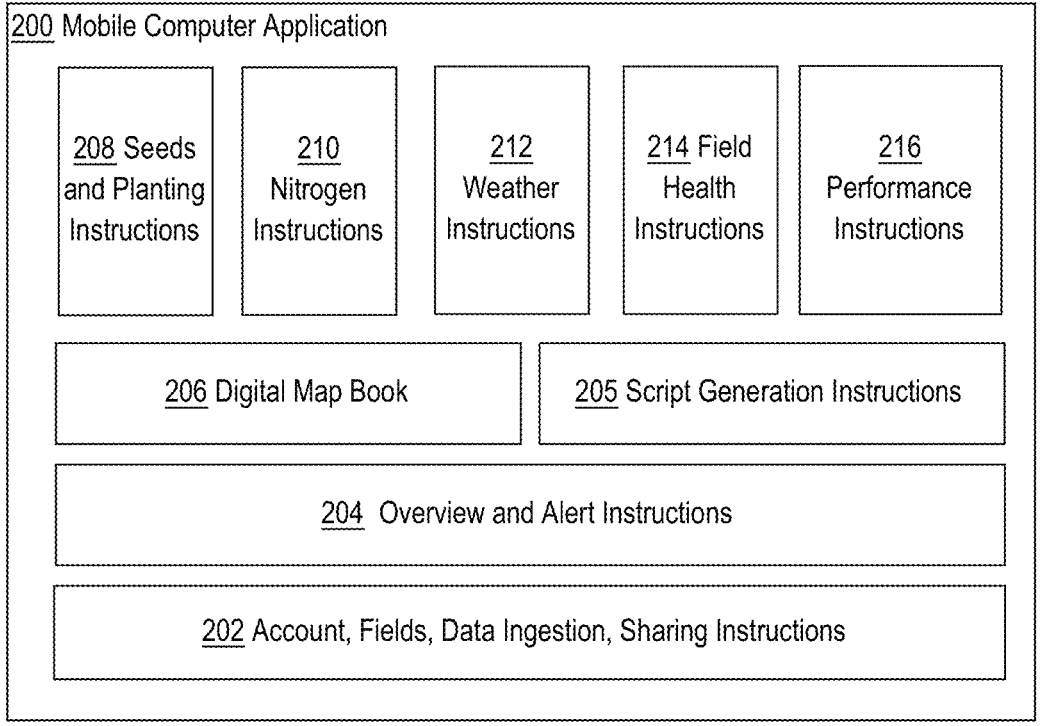
(b)
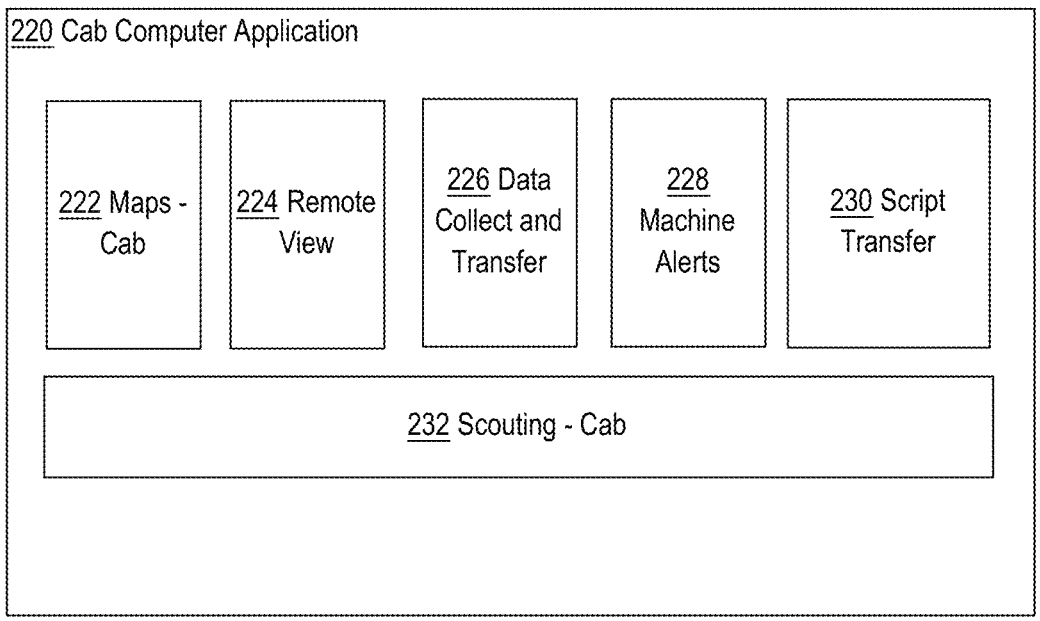

FIG. 5

Data Manager

Nitrogen | Planting | Practices | Soil

Planting 1(4 Fields)  
Crop Corn Product  
Plant Date: 2016-04-12  
ILU 112 | Pop: 34000  
[Edit] [Apply]

Planting 2(0 Fields)  
Crop Corn Product  
Plant Date: 2016-04-15  
ILU 83 | Pop: 34000  
[Edit] [Apply]

Planting 3(0 Fields)  
Crop Corn Product  
Plant Date: 2016-04-13  
ILU 83 | Pop: 34000  
[Edit] [Apply]

Planting 4(1 Fields)  
Crop Corn Product  
Plant Date: 2016-04-13  
ILU 112 | Pop: 34000  
[Edit] [Apply]

+  
Add New Planting Plan

| | CROP | PLANTED ACRES | PRODUCT | RELATIVE MATURITY | TARGET YIELD | POPULATION(AVG) | PLA |
|---|---|---|---|---|---|---|---|
| ☐ Select All | | | | | | | |
| ☐ Ames, IA 1<br>Corn \| 100 \| Boone, IA | Corn | — | DMC82-M | 112 | 160 | 34000 | Apr |
| ☐ Austin, MN 1<br>Corn \| 100 \| Fredricks, MN | Corn | — | DMC82-M | 114 | 160 | 36000 | Apr |
| ☐ Boone, IN 1<br>Corn \| 100 \| Boone, IA | Corn | — | DMC82-M | 112 | 150 | 34000 | Apr |
| ☐ Champaign 1<br>Corn \| 100 \| Champaign, IL | Corn | — | — | 112 | 200 | 34000 | Apr |
| ☐ E Nebraska 1<br>Corn \| 100 \| Burt, NE | Corn | — | — | 112 | 160 | 34000 | Apr |

*FIG. 6*

DETECTION OF PLANT DISEASES WITH MULTI-STAGE, MULTI-SCALE DEEP LEARNING

BENEFIT CLAIM

This application claims the benefit under 35 U.S.C. § 119(e) of provisional application 62/750,143, filed Oct. 24, 2018, the entire contents of which are hereby incorporated by reference for all purposes as if fully set forth herein. Applicant hereby rescinds any disclaimer of claim scope in the parent applications or the prosecution history thereof and advises the USPTO that the claims in this application may be broader than any claim in the parent applications.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2019 The Climate Corporation.

FIELD OF THE DISCLOSURE

The present disclosure relates to the technical areas of plant disease detection and machine learning. The present disclosure also relates to the technical area of processing images at different scales to recognize diseases having symptoms of different sizes.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Plant disease detection is important in agriculture. Today an automated approach often involves classifying plant photos by learning from sample photos. Each photo can show a leaf having disease symptoms. Sometimes, these symptoms are caused by multiple diseases. Sometimes, these symptoms have different sizes or overlap one another. It would be helpful to have an efficient and accurate approach of recognizing the plant diseases infecting the leaf from such a photo without requiring as samples a large number of photos showing various symptoms of these plant diseases.

SUMMARY

The appended claims may serve as a summary of the disclosure.

BRIEF DESCRIPTION OF THE DRAWINGS

In the drawings.

FIG. 2 illustrates two views of an example logical organization of sets of instructions in main memory when an example mobile application is loaded for execution.

FIG. 5 depicts an example embodiment of a timeline view for data entry.

FIG. 6 depicts an example embodiment of a spreadsheet view for data entry.

DETAILED DESCRIPTION

Figure 1:
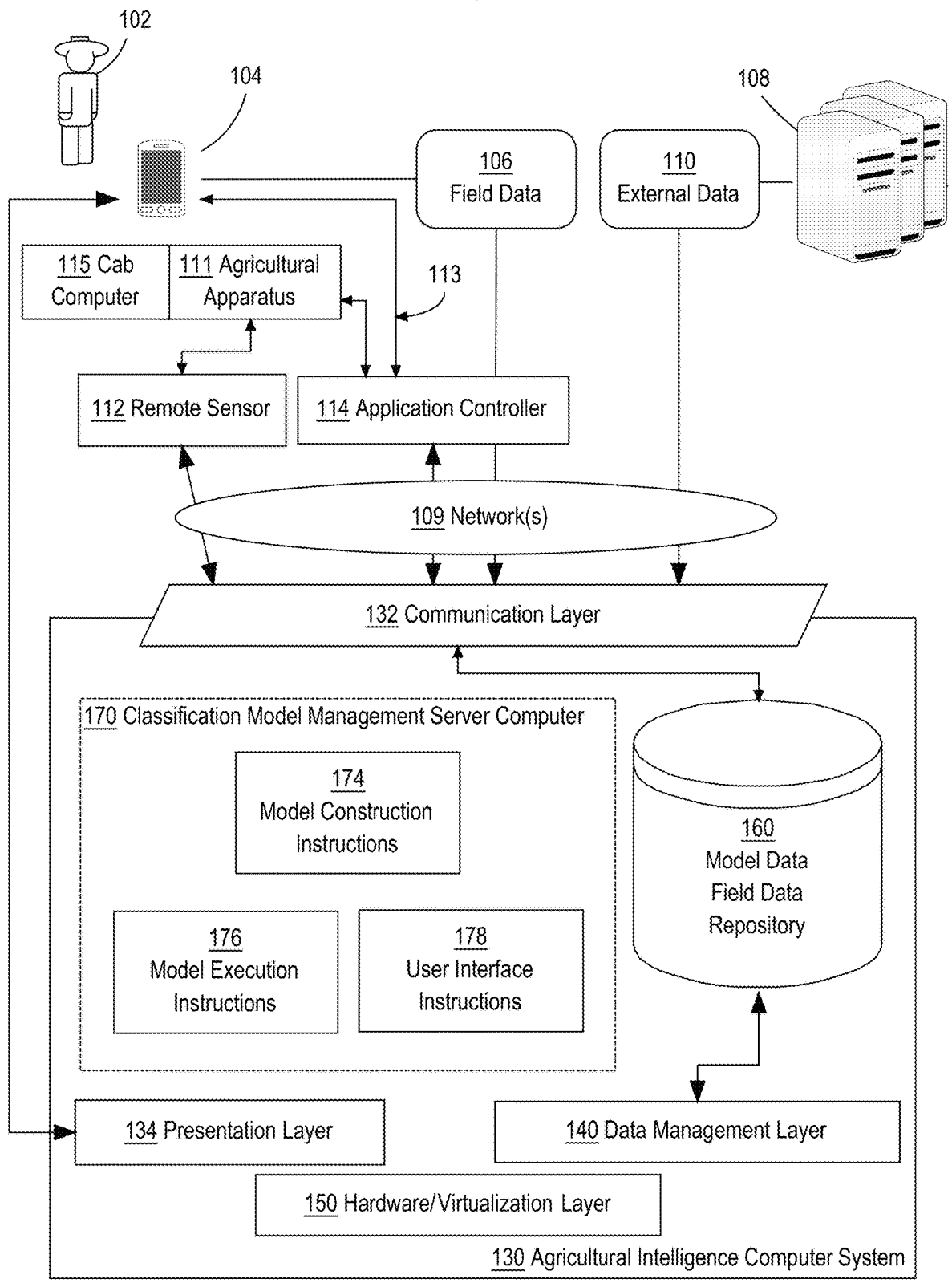
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:
1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW—AGRONOMIC MODEL TRAINING
   2.5. IMPLEMENTATION EXAMPLE—HARDWARE OVERVIEW
3. FUNCTIONAL DESCRIPTIONS
   3.1 TRAINING SET AND DIGITAL MODEL CONSTRUCTION
   3.2 DIGITAL MODEL EXECUTION
   3.3 EXAMPLE PROCESSES
4. EXTENSIONS AND ALTERNATIVES
1. General Overview
A system for recognizing plant diseases producing multi-sized symptoms from a plant photo is disclosed. In some embodiments, the system is programmed to build from multiple training sets multiple digital models, each for recognizing plant diseases having symptoms of similar sizes. Each digital model can be implemented with a deep learning architecture, such as a convolutional neural network (CNN), that classifies an image into one of several classes. For each training set, the system is thus programmed to collect images showing symptoms of one or more plant diseases having similar sizes. These images are then assigned to multiple disease classes. For a first one of the training sets used to build the first digital model, the system is programmed to also include images that correspond to a healthy condition and images of symptoms having other sizes. These images are then assigned to a no-disease class and a catch-all class. Given a new image from a user device, the system is programmed to then first apply the first digital model. For at least the portions of the new image that are classified by the first digital model into the catch-all class, the system is programmed to then apply another one of the digital models. The system is programmed to finally transmit classification data to the user device indicating how each portion of the new image is classified into a class corresponding to a plant disease or no plant disease at all.

In some embodiments, the plant is corn. Each image can be a digital image and is typically a photo showing a corn leaf infected with one or more diseases. The system can be programmed to build two digital models, a first one for recognizing those corn diseases producing relatively small symptoms, and a second one for recognizing those corn diseases producing relatively large symptoms.

In some embodiments, for the first training set for building the first digital model, the system can be configured to include photos showing mainly symptoms of those diseases having relatively small symptoms. These photos would thus have relatively small sizes. Alternatively, the system can be configured to include scaled versions of these photos corresponding to similar field of views as the originals but having a fixed size. The system can be configured to also include photos corresponding to similar field of views but showing no symptoms or showing symptoms of those diseases having relatively large symptoms. Therefore, the first digital model is designed to classify a corn image into a class corresponding to one of those corn diseases having relatively small symptoms or a healthy condition or a catch-all class corresponding to a combination of those corn diseases having relatively large symptoms.

In some embodiments, for the second training set for building the second digital model, the system can be configured to include photos showing mainly symptoms of those diseases having relatively large symptoms. These photos would thus have relatively large sizes. Alternatively, the system can be configured to include scaled versions of these photos corresponding to similar field of views as the originals but having a fixed size. Therefore, the second digital model is designed to classify a corn image into a class corresponding to one of those corn diseases having relatively large symptoms. The system can be programmed to build the first digital model and the second digital model as CNNs respectively from the first training set and the second training set.

In some embodiments, the system is programmed to receive a new image, such as a new photo of an infected corn leaf, from a user device and apply the digital models to the new image. Specifically, the system is programmed to first apply the first digital model to the new image to classify each first region within the new image into one of the classes corresponding to corn diseases having relatively small symptoms, a healthy condition, or the combination of corn diseases having relatively large symptoms. The system is programmed to next apply the second digital model to each second region within the combination of first regions that have been classified into the catch-all class into one of the classes corresponding to corn diseases having relatively large symptoms. The second region is typically larger than first region corresponding to a larger symptom or a larger field of view. The system can be programmed to then send classification data related to how each first region or second region is classified into one of the classes corresponding to corn diseases or the healthy condition to the user device.

The system produces various technical benefits. The system allows detection of multiple plant diseases from one plant image. The system also allows detection of one plant disease having relatively small symptoms even when such symptoms overlap with relatively large symptoms of another plant disease. In addition, the system also allows detection of plant diseases having multi-sized symptoms from one plant image. More specifically, the system enables association of each of a plurality of regions within a plant with one of a plurality of plant diseases or a healthy class, even when the diseases symptoms have different sizes. Furthermore, the multi-stage approach where different digital models designed to identify separate groups of symptoms are sequentially applied achieves accuracy while requiring relatively few sample images compared to the one-stage approach of detect different groups of symptoms at once. In particular, the multi-stage approach can utilize multiple images extracted from an image used to train the one-stage approach, with the image showing multiple groups of symptoms and each extracted image showing symptoms of only one of the groups.

Other aspects and features of embodiments will become apparent from other sections of the disclosure.

2. Example Agricultural Intelligence Computer System 2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines, harvesters, sprayers, and cultivators. Application controller 114 is communicatively coupled to agricultural intelligence computer system 130 via the network(s) 109 and is programmed or configured to receive one or more scripts that are used to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U.S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
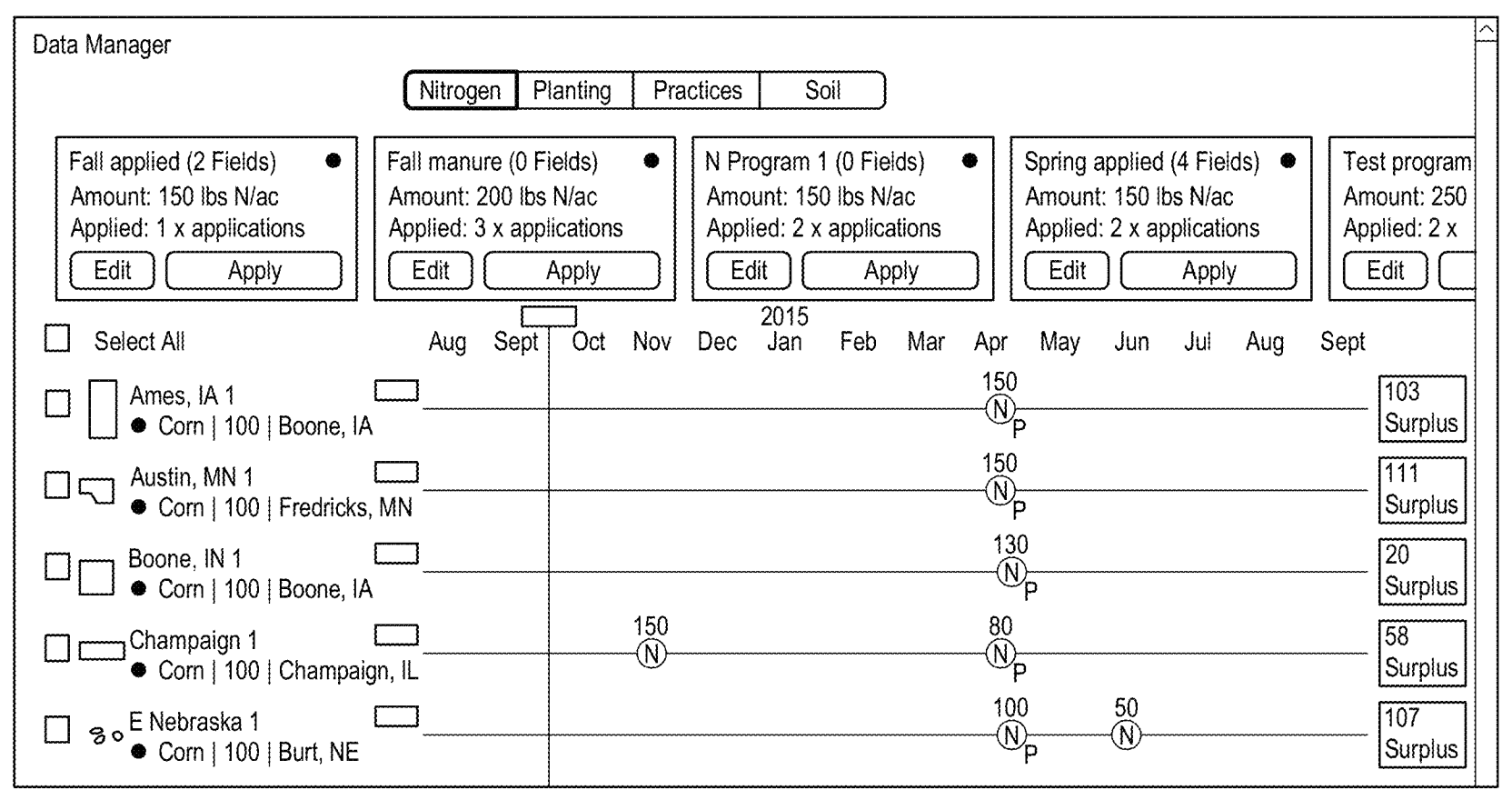

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs N/ac in early April. The data manager may provide an interface for editing a program. In an embodiment, when a particular program is edited, each field that has selected the particular program is edited. For example, in FIG. 5, if the "Spring applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field. While the nitrogen application in early April may remain, updates to the "Spring applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In an embodiment, agricultural intelligence computer system 130 is programmed to comprise a classification model management server computer (server) 170. The server 170 is further configured to comprise model construction instructions 174, model execution instructions 176, and user interface instructions 178.

In some embodiments, the model construction instructions 174 offer computer-executable instructions to assemble training sets and build digital models from the training sets for recognizing plant diseases having multi-sized symptoms from a plant image. Each digital model is designed to recognize plant diseases having similar-sized symptoms. Therefore, each training set includes images corresponding to a distinct field of view or a distinctly sized area within a plant leaf. The model configuration instructions 172 offer computer-executable instructions to specifically split given images with a sliding window into individual regions for the training sets. Each digital model can be implemented with a deep learning architecture that classifies a new image into one of a plurality of classes, each corresponding to a plant disease, a healthy condition, or a catch-call combination of multiple plant diseases.

In some embodiments, the model execution instructions 176 offer computer-executable instructions to apply the digital models to new images for classification. Each new image can be a new plant photo showing multi-sized symptoms of one or more plant diseases. A first digital model for recognizing a first group of diseases having symptoms sized within a first distinct range is applied to the new image. More specifically, the new image can be scaled as necessary and different first regions of the new image can be classified with the first digital model into a class corresponding to one of the first group of plant diseases, a healthy condition, or a catch-all class for all other plant diseases. The size of each first region would correlate with the sizes in the first distinct range. Next, a second digital model for recognizing a second group of diseases having symptoms sized within a second distinct range is applied to the combination of first regions classified into the catch-all class. The remaining process related to the first digital model can similarly be performed with the second digital model or additional digital models until every area of the new image is classified into at least one class corresponding to one of the plant diseases.

In some embodiments, the user interface instructions 178 offer computer-executable instructions to manage communications with other devices. The communications may include receiving initial image data for training purposes from an image source, receiving a new photo for classification from a user device, sending classification results for the new photo to the user device, or sending the digital models to another computing device.

Each component of the server 170 comprises a set of one or more pages of main memory, such as RAM, in the agricultural intelligence computer system 130 into which executable instructions have been loaded and which when executed cause the agricultural intelligence computing system to perform the functions or operations that are described herein with reference to those modules. For example, the model construction module 174 may comprise a set of pages in RAM that contain instructions which when executed cause performing the location selection functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each component of the server 170 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computing system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Figure 4:
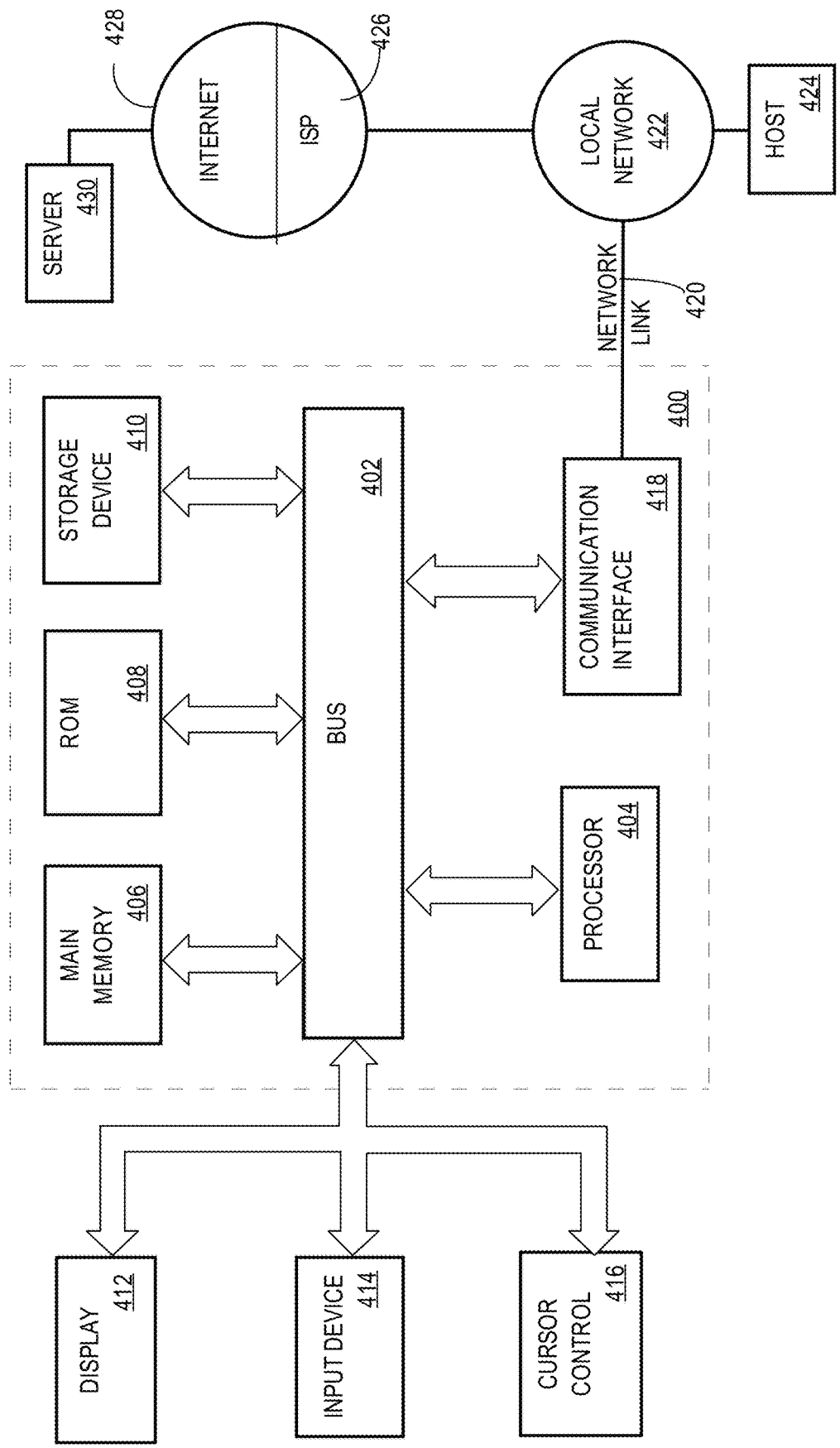
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114 which include an irrigation sensor and/or irrigation controller. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns.

Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the field manager computing device 104, agricultural apparatus 111, or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. patent application Ser. No. 15/551,582, filed on Aug. 16, 2017, may be used, and the present disclosure assumes knowledge of those patent disclosures.

2.4. Process Overview—Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
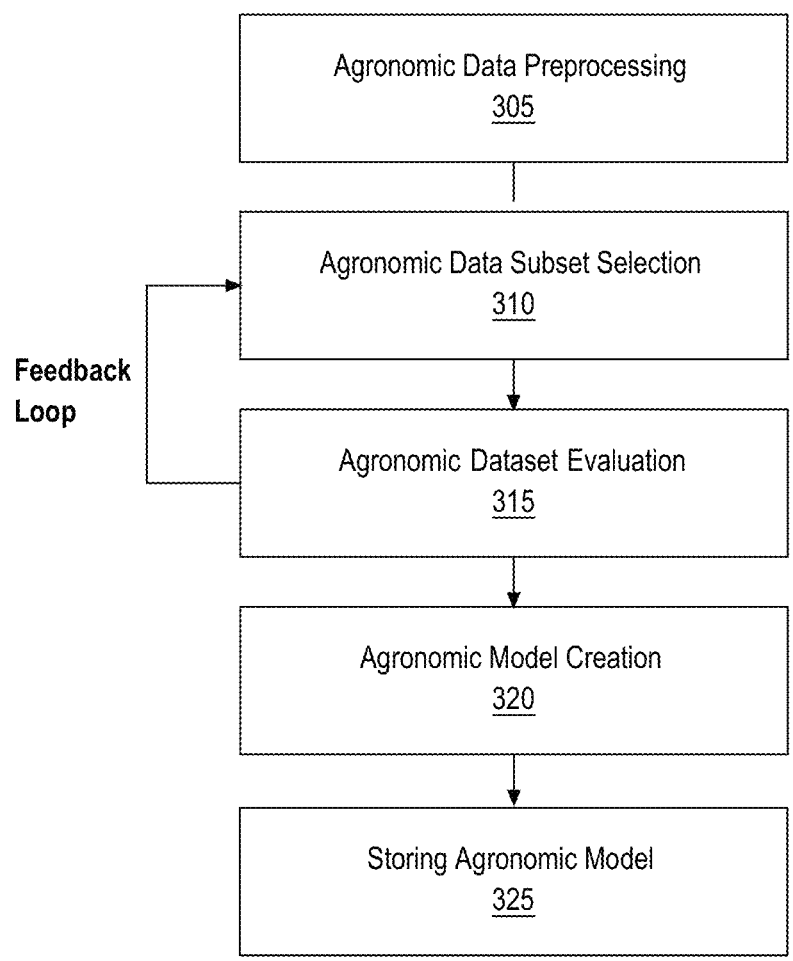
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Functional Descriptions 3.1 Training Set and Digital Model Construction

In some embodiments, the server 170 is programmed to collect one or more training sets of images to train digital models for recognizing plant diseases. For corn, the one or more training sets of images may include photos of corn leaves. Each photo preferably shows non-overlapping disease symptoms. The common corn diseases include Anthracnose Leaf Blight (ALB), Common Rust (CR), Eyespot (EYE), Gray Leaf Spot (GLS), Goss's Wilt (GW), Northern Leaf Blight (NLB), Northern Leaf Spot (NLS), Southern Leaf Blight (SLB), and Southern Rust (SR). The symptoms of different diseases tend to look different. For example, CR, EYE, SR, and GLS at an early stage (GLS-Early) tend to produce relatively small lesions that are dot-like or slightly elongated, while GW, NLB, and GLS at a late stage (GLS-Late) tend to produce relatively large lesions that are strip-like or greatly elongated. Therefore, at least two training sets can be constructed to train at least two digital models, with each digital model designed to classify an input image into one or more classes corresponding to one or more plant diseases having similarly-sized symptoms.

In some embodiments, given a specific image, the server 170 can be programmed to first resize the specific image to a standard size and then extract images from the resized image for a training set using a sliding window with a certain stride (the number of pixels to shift the sliding window over the input image). The server 170 can be programmed to further assign a class label of one of the one or more classes noted above to each of the extracted images. Specifically, the server 170 can be programmed to receive the class label from an expert or automatically determine the class label based on images of known disease symptoms. For example, an image of a symptom of a known disease at an appropriate resolution can be matched to an extracted image using any matching technique known to someone skilled in the art, and the extracted image can be assigned a class label corresponding to the known disease when the match is successful.

Figure 7A:
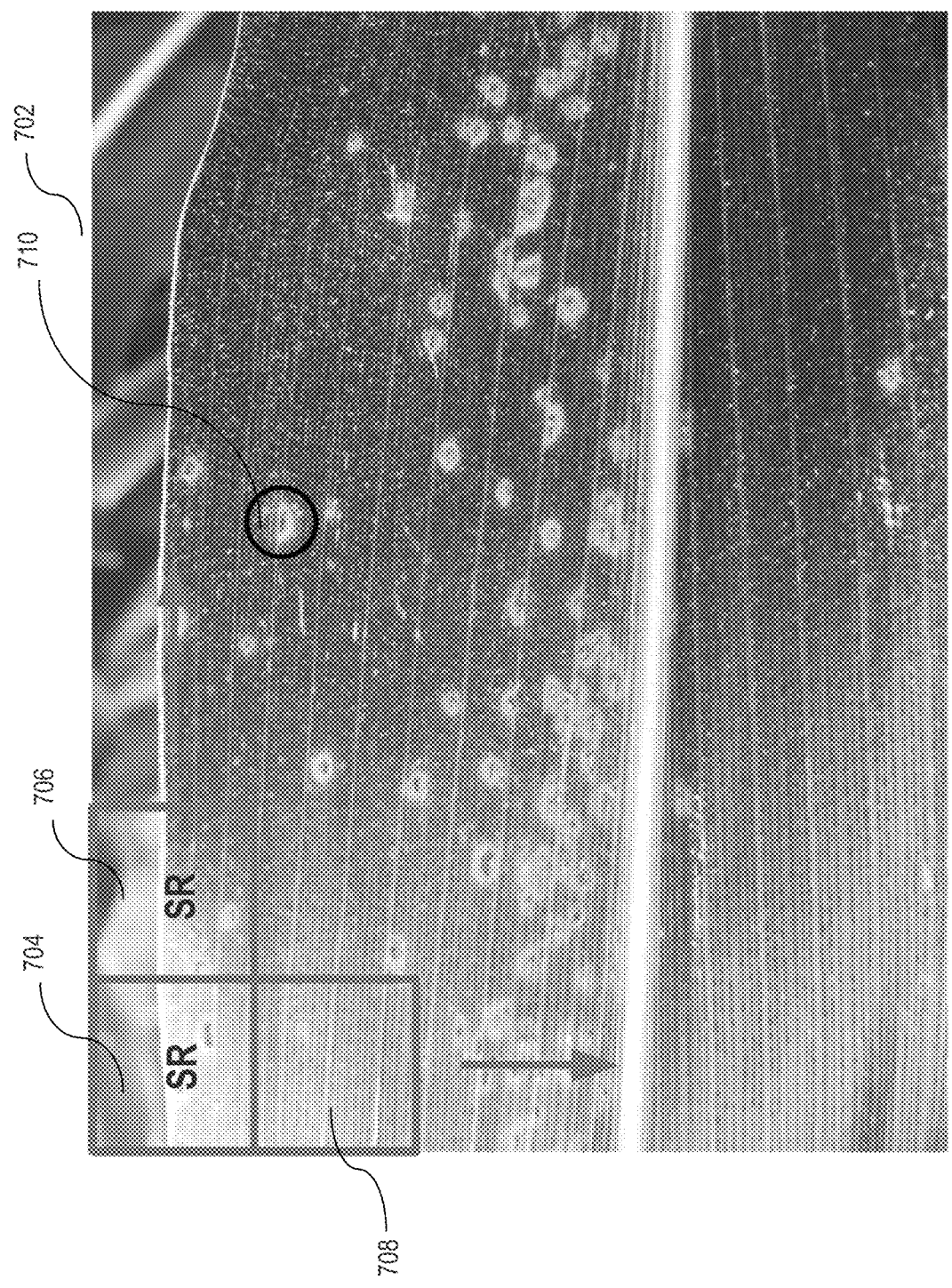
FIG. 7A illustrates an example approach of extracting sample images from a photo showing symptoms of a plant disease that are relatively small.

FIG. 7A illustrates an example approach of extracting sample images from a photo showing symptoms of a plant disease that are relatively small. In some embodiments, the given image is a photo of a corn leaf having symptoms of SR. The server 170 can be programmed to resize the given image into the image 702 to a first size with a first scaling factor relatively to a fixed-sized sliding window, such as from 3,000 pixels by 4,000 pixels to 1,120 (224*5) pixels by 1,493 pixels with the first scaling factor being 5 relative to a sliding window having a size of 224 pixels by 224 pixels, using a resizing technique known to someone skilled in the art. The image 720 still shows relatively small symptoms of SR, such as the lesion in the area 710. The server 170 is programmed to then apply a sliding window that is relatively small to the image 702 row by row or column by column with a certain stride that determines where the next position of the sliding window is relative to the current position. For example, with the sliding window having a size of 224 pixels by 224 pixels, the stride can be 224 pixels leading to no overlap between the next position and the current position, and a total of 30 images can be extracted when the image 702 has 1,120 pixels by 1,493 pixels. Therefore, from an initial position 704 of the sliding window, the next position in the same row would be 706, and the next position in the same column would be 708. The portion of the image 702 corresponding to each position of the sliding window can be extracted and assigned a class label. In this example, the portion corresponding to the position 704 can be assigned a label of "SR" for the SR disease class given the presence of SR lesions, the portion corresponding to the position 706 can similarly be assigned a label of "SR", and the portion corresponding to the position 706 can be assigned a label that represents a healthy condition or a lack of disease symptoms for a no disease (ND) class.

Figure 7B:
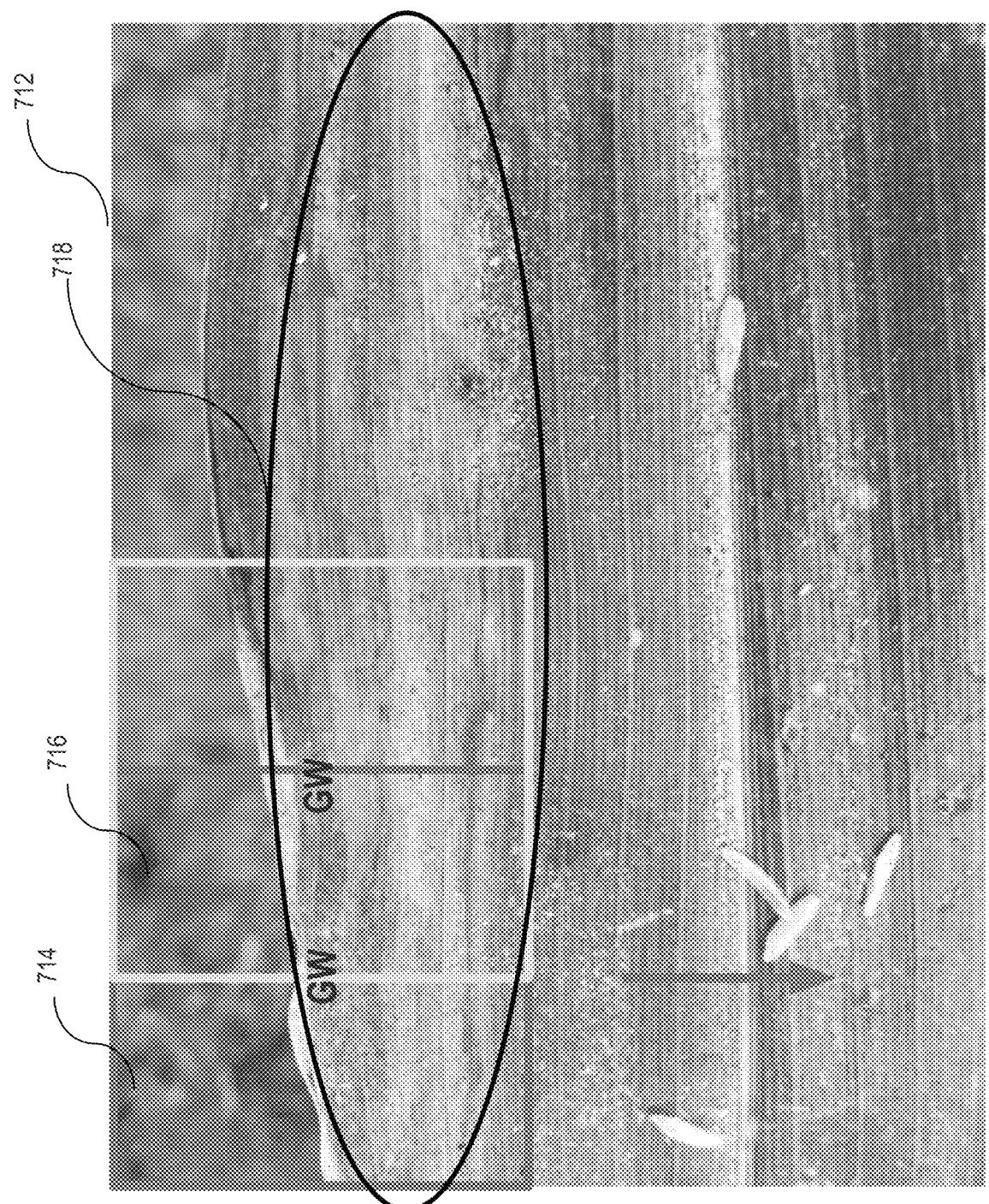
FIG. 7B illustrates an example approach of extracting sample images from a photo showing symptoms of a plant disease that are relatively large.

FIG. 7B illustrates an example approach of extracting sample images from a photo showing symptoms of a plant disease that are relatively large. In some embodiments, the image can be a photo of a corn leaf having symptoms of GW. The server 170 is programmed to resize the given image into the image 712 with a second scaling factor smaller than the first scaling factor, such as from 3,000 pixels by 4,000 pixels to 448 (224*2) pixels by 597 pixels with the second scaling factor being 2, using a resizing technique known to someone skilled in the art. The image 712 still shows relatively large symptoms of GW, such as the lesion in the area 718. The server 170 is programmed to then apply a sliding window that is relatively large to the image to the image 712 row by row or column by column with a certain stride that determines where the next position of the sliding window is relative to the current position. For example, with the sliding window having size of 224 pixels by 224 pixels, the stride can be 112 pixels leading to a half overlap between the next position and the current position, and a total of 12 images can be extracted when the image 712 has 448 pixels by 597 pixels. Therefore, from an initial position 714 of the sliding window, the next position in the same row would be 716. The portion of the image 712 corresponding to each position of the sliding window can be extracted and assigned a class label. In this example, the portion corresponding to the position 714 can be assigned a label of "GW" for the GW disease class given the presence of GW lesions, and the portion corresponding to the position 716 can similarly be assigned a label of "GW".

In some embodiments, the server 170 is programmed to process a number of images to extract enough sample images for each of the plant diseases. The images can be retrieved from image servers or from user devices. The images preferably show symptoms of each plant disease in different conditions, such as at different points within the lifecycle of the plant, resulting from different lighting conditions, or having different shapes, sizes, or scales. To further increase the breadth of a digital model, the server 170 can be programmed to include more images showing overlapping symptoms of a plant disease having relatively large symptoms and a plant disease having relatively small symptoms to improve detection of the relatively small symptoms. For example, these images can show overlapping symptoms of GLS-Late (large) and CR (small), GW (large) and CR, GW and SR (small), NLB (large) and CR, or NLB and SR. The server 170 can be programmed to further assign each image extracted from one of these images to the class corresponding to the dominant disease based on the total area covered by the symptoms of each disease in the extracted image.

In some embodiments, the server 170 is programmed to generate variants of the extracted images to augment the training set. More specifically, the server 170 can be configured to rotate or further scale the extracted images. For corn, there can be at least 200 images for the healthy condition and for each corn disease, including less than 10% that show overlapping symptoms. Two digital models can be constructed, a first one for detecting corn diseases having relatively small symptoms and a second one for detecting corn diseases having relatively large symptoms. Therefore, a first training set and a second training set can be built respectfully for the first digital model and the second digital model, as illustrated in FIG. 7A and FIG. 7B. Each training set can include images showing symptoms of the corn diseases to be detected by the corresponding digital model. Depending on how the digital models are to be applied to a test image, each training set can include additional images. When the first digital model and the second digital model are to be applied sequentially, as further discussed below, the first training set can include additional images that show symptoms of those diseases which the second digital model is designed to detect and that are assigned a common label representing a catch-all class of all those diseases. These additional images can be generated by processing (scaled to capture a certain field of view, etc.) an original image used for the second training set as an original image used for the first training set.

In some embodiments, the server 170 is programmed to build the digital models for recognizing plant diseases from the training sets. The digital models can be any classification models known to someone skilled in the art, such as a decision tree or a CNN. For corn, the server 170 can be programmed to build the two digital models from the two training sets, as discussed above. The first digital model is used to recognize corn diseases having relatively small symptoms, such as CR, EYE, SR, or GLS-Early, and the second digital model is used to recognize corn diseases having relatively large symptoms, such as GW, NLB, or GLS-Late. To implement each digital model as a CNN, public libraries can be used, such as the ResNet-50 package available on the GitHub platform.

3.2 Digital Model Execution

In some embodiments, the server 170 is programmed to receive a new image to be classified from a user device and apply the digital models to the new image to obtain classifications. For corn, the server 170 can be programmed to apply the two digital models in sequence to first detect corn diseases having relatively small symptoms and subsequently detect corn diseases having relatively large symptoms.

Figure 8:
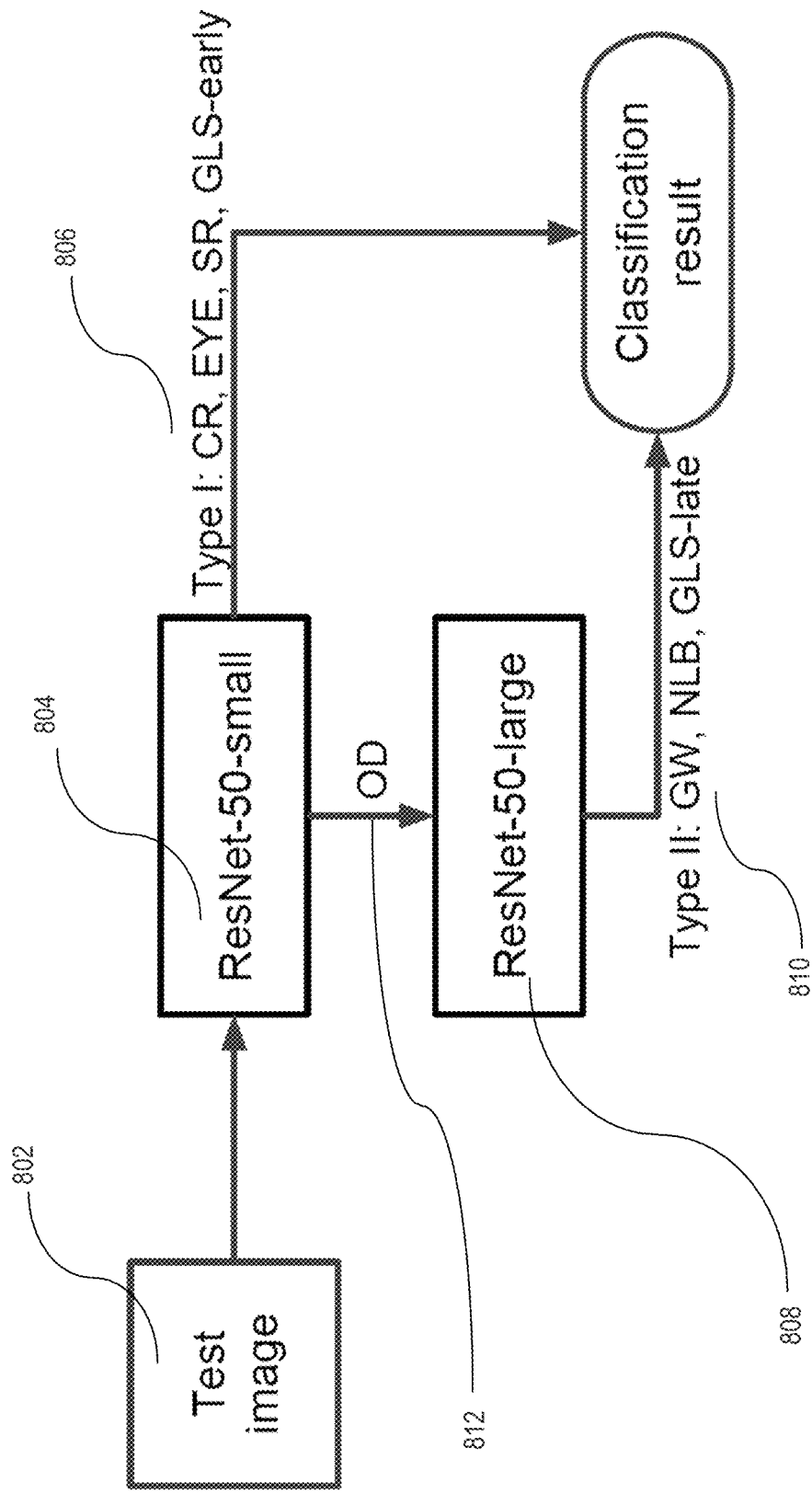
FIG. 8 illustrates an example process of recognizing plant diseases having multi-sized symptoms from a plant image using multiple digital models.

FIG. 8 illustrates an example process of recognizing plant diseases having multi-sized symptoms from a plant image using multiple digital models. In some embodiments, the plant is corn, and the plant image is a photo of a corn leaf. Given a new image 802 to be classified, the server 170 is programmed to first apply the first digital model for recognizing corn diseases having relatively small symptoms. Specifically, the server 170 can be programmed to resize the new image 802 similarly by the first scaling factor noted above into a resized image, such as from 3,000 pixels by 4,000 pixels to 1,120 (224*5) pixels by 1,493 pixels with the first scaling factor being 5. The server 170 is programmed to then apply a sliding window that is relatively small to the resized image row by row or column by column with a certain stride that determines where the next position of the sliding window is relative to the current position. The size of the sliding window would generally be equal to the size of a sample image (an extracted image) used to build the first digital model. For example, the sliding window can have a size of 224 pixels by 224 pixels, and the stride can be 224 pixels. For each position of the sliding window, the server 170 can be programmed to apply the first digital model 804 to the portion of the resized image within the sliding window to obtain a classification corresponding to the healthy condition, one of the corn diseases having relatively small symptoms, or the collection of corn diseases having relatively large symptoms. For example, the portions 806 are classified into CR, EYE, SR, GLS-Early, or ND, and the portions 812 are classified into an other diseases (OD) class.

In some embodiments, the server 170 can be programmed to map each portion of the resized image extracted by the sliding window back into a region of the new image 802. The server 170 is programmed to further prepare a prediction map for the new image 802 where each mapped region is shown with an indicator of the corresponding classification.

Figure 9A:
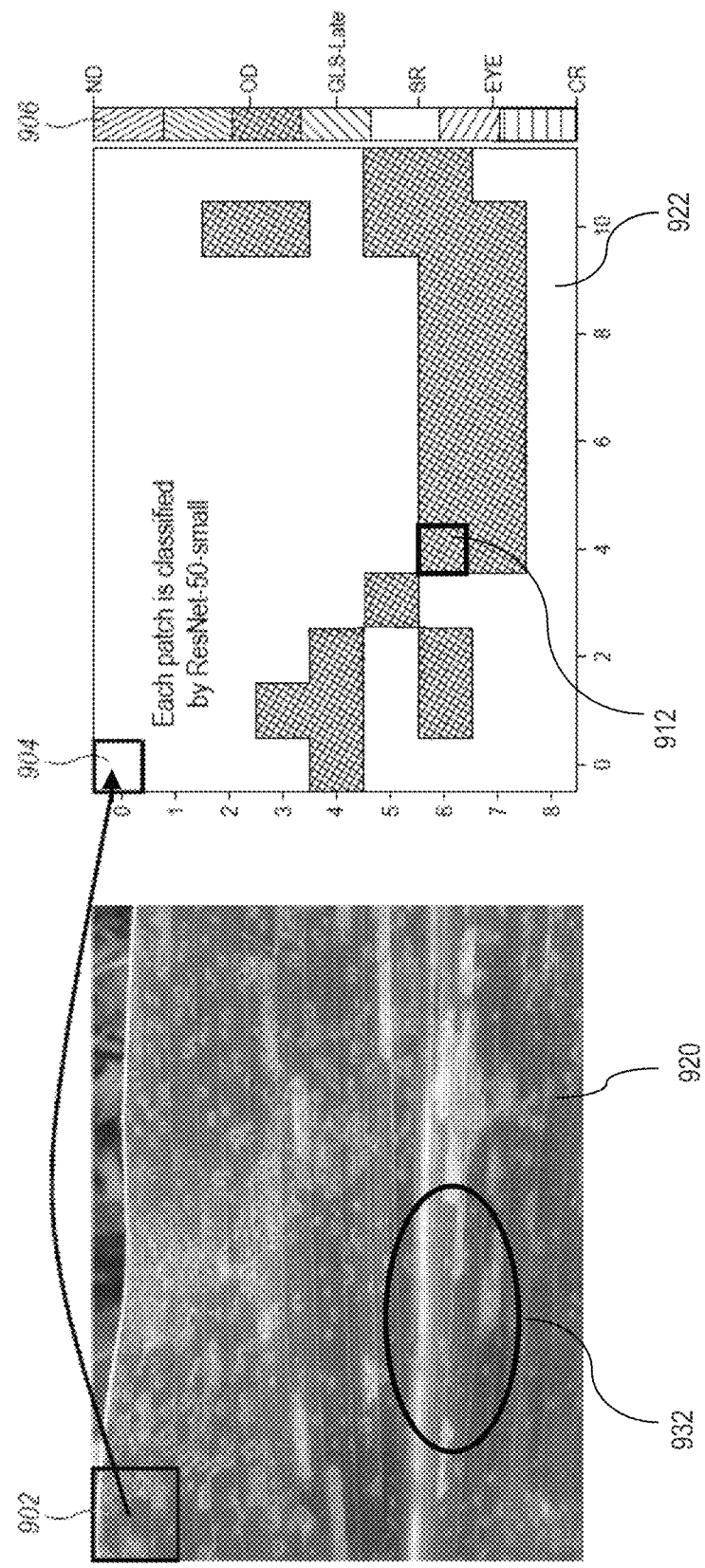
FIG. 9A illustrates an example prediction map showing results of applying a first digital model to a plant image to recognize plant diseases having relatively small symptoms.

FIG. 9A illustrates an example prediction map showing results of applying a first digital model to a plant image to recognize plant diseases having relatively small symptoms. In some embodiments, given the scale between the size of the sliding window and the size of a new image, essentially a relatively small sliding window is moved through different positions within a new image 920, including the position 902. Each region (first region) of the new image 920 corresponding to a position of the sliding window is then labeled with the corresponding classification in the prediction map 922 according to the legend 906. For example, the region 912 has been classified into the OD class representing the combination of corn diseases having relatively large symptoms.

Referring back to FIG. 8, in some embodiments, for the portions of the resized image that are classified into the OD class corresponding to the collection of corn diseases having relatively large symptoms, the server 170 is programmed to apply the second digital model 808 for recognizing corn diseases having relatively large symptoms. Referring back to FIG. 9A, each such portion, such as the one mapped to the region 912, corresponds to a relatively small field of view and thus typically only part of a relatively large symptom, as shown in the area 932. Therefore, the server 170 is programmed to apply the second digital model 808 to multiple such portions at once. More specifically, for each such portion, the server 170 can be configured to also consider a certain number of surrounding portions or a certain fraction of a surrounding portion in each direction to approximately match the field of view used for building the second digital model. For example, each such portion of 224 pixels by 224 pixels can be considered together with one surrounding portion in each direction, leading to a combined portion of 672 (224*3) pixels by 672 pixels. The server 170 can be configured to further resize the combined portion to the size of an input image for the second digital model, effecting resulting in a scaling factor of 5/3. The server 170 can be configured to then apply the second digital model to the resized combined portion to obtain a classification corresponding to one of the corn diseases having relatively large symptoms. Referring back to FIG. 8, the resized combined portions 810 are classified into GW, NLB, or GLS-Early.

In some embodiments, instead of including into the combined portion a neighboring portion that has not been classified into the ND class, the server 170 can be programmed to mask (e.g., with zero values) each of the plurality of first regions in the new image 802 that is classified into a class corresponding to one of the first plurality of plant diseases or a healthy condition. In some embodiments, the server 170 can be programmed to resize the new image 802 with masked portions similarly by the second scaling factor noted above into a resized image, such as from 224 pixels by 224 pixels to 448 (224*2) pixels by 448 pixels with the first scaling factor being 2. The server 170 can be programmed to then apply a sliding window that is relatively large to the resized image row by row or column by column with a certain stride. The size of the sliding window would generally be equal to the size of a sample image (extracted image) used to train the second digital model. For example, the sliding window can have a size of 224 pixels by 224 pixels, and the stride can be 112 or 224 pixels. For each position of the sliding window, the server 170 can be programmed to then apply the second digital model 804 to the portion of the resized image or the portion corresponding to the combined portion classified into the OD class within the sliding window to obtain a classification corresponding to one of the corn diseases having relatively large symptoms. In other embodiments, the server 170 is programmed to include images corresponding to a catch-all class only in the second training set and apply the second digital model before applying the first digital model to a new image.

Referring back to FIG. 8, in some embodiments, the server 170 can be programmed to similarly map each portion classified by the second digital model back into a region of the image 802. The server 170 is programmed to further update the prediction map for the image 802 where each newly mapped region is shown with an indicator of the corresponding classification. The server 170 can be programmed to then transmit classification data related to the updated prediction map to the user device.

Figure 9B:
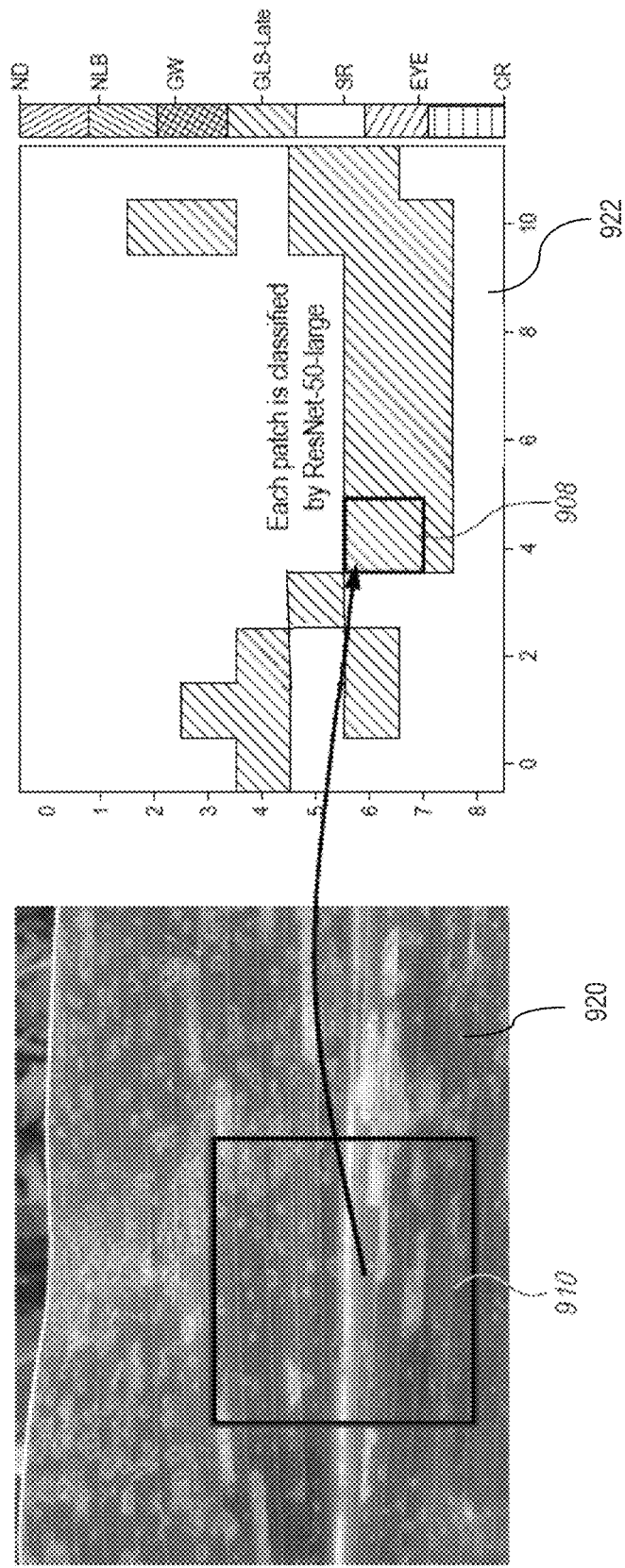
FIG. 9B illustrates an example prediction map showing results of applying a second digital model to a plant image to recognize plant diseases having relatively large symptoms.

FIG. 9B illustrates an example prediction map showing results of applying a second digital model to a plant image to recognize plant diseases having relatively large symptoms. In some embodiments, given the scale between the size of the sliding window and the size of a new image, essentially a relatively large sliding window is moved through different positions within the new image 920 or only within the portion classified into the OD class by the first digital model, including the position 910. Each region (second region) of the new image 920 corresponding to a position of the sliding window is then labeled with the corresponding classification in the prediction map 922, overwriting existing values. For example, the region 912 illustrated in FIG. 9A that was classified into the OD class is now under the region 908 classified into the class corresponding to GLS-Late. Therefore, while the new image 920 shows overlapping symptoms of SR and GLS-Late, both diseases are detected from different regions of the new image 920.

In some embodiments, the server 170 is programmed to further process the updated prediction map. The server 170 can be configured to compute the total area classified into each of the classes and conclude that disease corresponding to the class having the largest total area is the dominant disease in the plant captured in the new image. For example, the updated prediction map 922 shows that symptoms of SR and GLS-Late each occupy approximately half of the new image 920 and thus could be considered as the dominant disease for the particular corn captured in the new image 920. The server 170 can be configured to further transmit dominance information related to the dominant disease to the user device.

3.3 Example Processes

Figure 10:
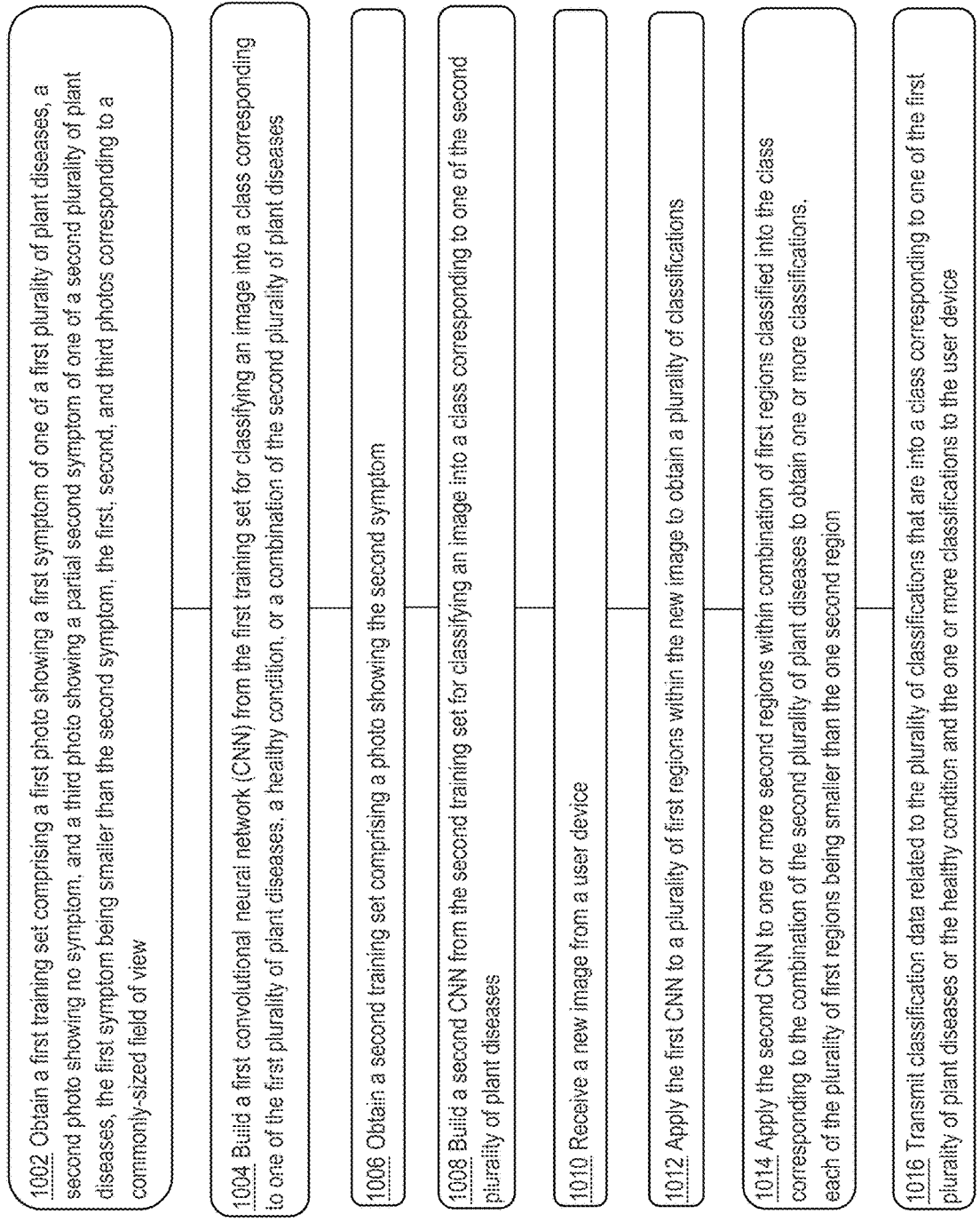
FIG. 10 illustrates an example method performed by a server computer that is programmed for recognizing plant diseases having multi-sized symptoms from a plant image.

FIG. 10 illustrates an example method performed by a server computer that is programmed for recognizing plant diseases having multi-sized symptoms from a plant image. FIG. 10 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In some embodiments, in step 1002, the server 170 is programmed or configured to obtain a first training set comprising a first photo showing a first symptom of one of a first plurality of plant diseases, a second photo showing no symptom, and a third photo showing a partial second symptom of one of a second plurality of plant diseases. The first plurality of plant diseases produce symptoms having sizes within a first range. The second plurality of plant diseases produce symptoms having sizes within a second range. The first symptom is smaller than the second symptom, and the first, second, and third photos correspond to a commonly-sized field of view. The server 170 can be configured to generate the first training set from photos showing multi-sized disease symptoms by using a sliding window suitable for capturing individual symptoms of the first plurality of plant diseases.

In some embodiments, in step 1004, the server 170 is programmed or configured to build a first CNN from the first training set for classifying an image into a class corresponding to one of the first plurality of plant diseases, a healthy condition, or a combination of the second plurality of plant diseases. Therefore, when the first CNN is configured to recognize symptoms of k diseases, the first CNN is configured to classify an image into one of k+2 classes. It is also possible to lump the no-disease class into the catch-all class and configure the second CNN to classify an image into the no-disease class.

In some embodiments, in step 1006, the server 170 is programmed or configured to obtain a second training set comprising a photo showing the second symptom. The server 170 can be similarly configured to generate the second training set from photos showing multi-sized or just multiple disease symptoms by using a sliding window suitable for capturing individual symptoms of the second plurality of plant diseases.

In some embodiments, the server 170 is programmed or configured to build a second CNN from the second training set for classifying an image into a class corresponding to one of the second plurality of plant diseases. The server 170 can be configured to send the first and second CNNs to another computing device, which can then be configured to apply the two CNNs to classify a new photo of an infected plant.

In some embodiments, in step 1008, the server 170 is programmed or configured to receive a new image from a user device. The new image can be a photo of an infected plant showing multi-sized symptoms.

In some embodiments, in step 1010, the server 170 is programmed or configured to apply the first CNN to a plurality of first regions within the new image to obtain a plurality of classifications. The size of each of the first regions is suitable for representing individual symptoms of the first plurality of plant diseases.

In some embodiments, in step 1012, the server 170 is programmed or configured to apply the second CNN to one or more second regions within combination of first regions classified into the class corresponding to the combination of the second plurality of plant diseases to obtain one or more classifications, each of the plurality of first regions being smaller than the one second region. The size of each of the second regions is suitable for representing individual symptoms of the second plurality of plant diseases.

In some embodiments, in step 1014, the server 170 is programmed or configured to transmit classification data related to the plurality of classifications that are into a class corresponding to one of the first plurality of plant diseases or the healthy condition and the one or more classifications to the user device. The classification data may include, for one or more regions of the new image, the size of the region and the corresponding classification. The server 170 can be further configured to identify a dominant disease for the new image, such as the disease to which the largest area of the new image has been classified, and send information regarding the dominant disease as part of the classification data.

4. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method of recognizing plant diseases having multi-sized symptoms from a plant image, comprising:
    obtaining, by a processor, a first training set from at least a first photo showing a first symptom of one of a first plurality of plant diseases, a second photo showing no symptom, and a third photo showing a partial second symptom of one of a second plurality of plant diseases, the first symptom being smaller than the second symptom,
    the first, second, and third photos corresponding to similarly-sized fields of view;
    building, by the processor, a first digital model from the first training set for classifying an image into a class of a first set of classes corresponding to the first plurality of plant diseases, a healthy condition, or a combination of the second plurality of plant diseases;
    obtaining a second training set from at least a fourth photo showing the second symptom;
    building a second digital model from the second training set for classifying an image into a class of a second set of classes corresponding to the second plurality of plant diseases;
    receiving a new image from a user device;
    applying the first digital model to a plurality of first regions within the new image to obtain a plurality of classifications;
    applying the second digital model to one or more second regions, each corresponding to a combination of multiple first regions of the plurality of first regions, to obtain one or more classifications,
    the multiple first regions being classified into the class corresponding to the combination of the second plurality of plant diseases;
    transmitting classification data related to the plurality of classifications into a class corresponding to one of the first plurality of plant diseases or the healthy condition and the one or more classifications to the user device.

2. The computer-implemented method of claim 1, the first digital model or the second digital model being a convolutional neural network (CNN) or a decision tree.

3. The computer-implemented method of claim 1,
    the first plurality of plant diseases including Common Rust, Eyespot, Southern Rust, or Gray Leaf Spot at an early stage,
    the second plurality of plant diseases including Goss's Wilt, Northern Leaf Blight, or Gray Leaf Spot at a late stage.

4. The computer-implemented method of claim 1, the obtaining the first training set comprising:
    identifying a size of a sliding window;
    determining a first scaling factor;
    determining a first image size based on the size of the sliding window and the first scaling factor;
    resizing the first photo, the second photo, or the third photo according to the first image size to obtain a first resized photo, a second resize photo, or a third resized photo.

5. The computer-implemented method of claim 4, the obtaining the second training set comprising:
    determining a second scaling factor smaller than the first scaling factor;
    determining a second image size based on the size of the sliding window and the second scaling factor;
    resizing the fourth photo according to the second image size to obtain a fourth resized photo.

6. The computer-implemented method of claim 5, further comprising:
    determining a first stride and a second stride smaller than the first stride,
    the obtaining the first training set further comprising extracting a first set of areas from the first resized photo, the second resized photo, or the third resized photo using the sliding window with the first stride,
    the obtaining the second training set further comprising extracting a second set of areas from the fourth resized photo using the sliding window with the second stride.

7. The computer-implemented method of claim 6,
    the obtaining the first training set further comprising assigning a label of a class of the first set of classes to each of the first set of areas,
    the building the first digital model being performed further from the set of labels assigned to the first set of areas,
    the obtaining the second training set further comprising assigning a label of a class of the second set of classes to each of the second set of areas,
    the building the second digital model being performed further from the set of labels assigned to the second set of areas.

8. The computer-implemented method of claim 6, the applying the first digital model comprising:
    resizing the new image according to the first image size to obtain a first updated image;
    extracting the first plurality of regions from the first updated image using the sliding window with the first stride.

9. The computer-implemented method of claim 8, the applying the second digital model comprising:
    masking each of the plurality of first regions in the new image that is classified into a class corresponding to one of the first plurality of plant diseases or a healthy condition to obtain a masked image;
    resizing the masked image according to the second image size to obtain a second updated image;
    extracting the one or more second regions from the second updated image using the sliding window with the second stride.

10. The computer-implemented method of claim 1, the applying the second digital model comprising resizing a portion of a combination of multiple first regions of the first plurality of regions to obtain the one second region.

11. The computer-implemented method of claim 1, the first training set being further obtained from a specific photo showing a third symptom of one of the first plurality of plant diseases and a fourth symptom of one of the second plurality of plant diseases, the fourth symptom overlapping with the third symptom.

12. The computer-implemented method of claim 1, further comprising:

computing a total size of the plurality of first regions and the one or more second regions classified into each of the first set of classes and the second set of classes;

determining a dominant class of the first set of classes and the second set of classes such that the total size of the plurality of first regions and the one or more second regions classified into the dominant class is largest;

the classification data including information regarding the dominant class.

13. One or more non-transitory computer-readable media storing one or more sequences of instructions which when executed cause one or more processors to execute a method of recognizing plant diseases having multi-sized symptoms from a plant image, the method comprising:

obtaining a first training set from at least a first photo showing a first symptom of one of a first plurality of plant diseases, a second photo showing no symptom, and a third photo showing a partial second symptom of one of a second plurality of plant diseases, the first symptom being smaller than the second symptom, the first, second, and third photos corresponding to similarly-sized fields of view;

building a first digital model from the first training set for classifying an image into a class of a first set of classes corresponding to the first plurality of plant diseases, a healthy condition, or a combination of the second plurality of plant diseases;

obtaining a second training set from at least a fourth photo showing the second symptom;

building a second digital model from the second training set for classifying an image into a class of a second set of classes corresponding to the second plurality of plant diseases;

receiving a new image from a user device;

applying the first digital model to a plurality of first regions within the new image to obtain a plurality of classifications;

applying the second digital model to one or more second regions, each corresponding to a combination of multiple first regions of the plurality of first regions, to obtain one or more classifications, the multiple first regions being classified into the class corresponding to the combination of the second plurality of plant diseases;

transmitting classification data related to the plurality of classifications into a class corresponding to one of the first plurality of plant diseases or the healthy condition and the one or more classifications to the user device.

14. The one or more non-transitory computer-readable media of claim 13, the obtaining a first training set comprising:

identifying a size of a sliding window;

determining a first scaling factor;

determining a first image size based on the size and the first scaling factor;

resizing the first photo, the second photo, or the third photo according to the first image size to obtain a first resized photo, a second resize photo, or a third resized photo.

15. The one or more non-transitory computer-readable media of claim 14, the obtaining a second training set comprising:

determining a second scaling factor smaller than the first scaling factor;

determining a second image size based on the size of the sliding window and the second scaling factor;

resizing the fourth photo according to the second image size to obtain a fourth resized photo.

16. The one or more non-transitory computer-readable media of claim 15, the method further comprising:

determining a first stride and a second stride smaller than the first stride, the obtaining the first training set further comprising extracting a first set of areas from the first resized photo, the second resized photo, or the third resized photo using the sliding window with the first stride, the obtaining the second training set further comprising extracting a second set of areas from the fourth resized photo using the sliding window with the second stride.

17. The one or more non-transitory computer-readable media of claim 16, the obtaining the first training set further comprising assigning a label of a class of the first set of classes to each of the first set of areas, the building the first digital model being performed further from the set of labels assigned to the first set of areas, the obtaining the second training set further comprising assigning a label of a class of the second set of classes to each of the second set of areas, the building the second digital model being performed further from the set of labels assigned to the second set of areas.

18. The one or more non-transitory computer-readable media of claim 16, the applying the first digital model comprising:

resizing the new image according to the first image size to obtain a first updated image;

extracting the first plurality of regions from the first updated image using the sliding window with the first stride.

19. The one or more non-transitory computer-readable media of claim 18, the applying the second digital model comprising:

masking each of the plurality of first regions in the new image that is classified into a class corresponding to one of the first plurality of plant diseases or a healthy condition to obtain a masked image;

resizing the masked image according to the second image size to obtain a second updated image;

extracting the one or more second regions from the second updated image using the sliding window with the second stride.

20. The one or more non-transitory computer-readable media of claim 13, the applying the second digital model comprising resizing a portion of a combination of multiple first regions of the first plurality of regions to obtain the one second region.

* * * * *